United States Patent
Frolikov

(10) Patent No.: US 11,288,116 B2
(45) Date of Patent: Mar. 29, 2022

(54) END OF SERVICE LIFE OF DATA STORAGE DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 197 days.

(21) Appl. No.: 15/898,120

(22) Filed: Feb. 15, 2018

(65) Prior Publication Data

US 2019/0250980 A1 Aug. 15, 2019

(51) Int. Cl.
*G06F 11/00* (2006.01)
*G06F 11/07* (2006.01)
*G06F 12/00* (2006.01)

(52) U.S. Cl.
CPC ........ *G06F 11/0793* (2013.01); *G06F 11/076* (2013.01); *G06F 11/0727* (2013.01); *G06F 12/00* (2013.01)

(58) Field of Classification Search
CPC . G06F 11/0727; G06F 11/0793; G06F 11/076
See application file for complete search history.

(56) References Cited

U.S. PATENT DOCUMENTS

| | | | | |
|---|---|---|---|---|
| 7,694,188 B2 * | 4/2010 | Raghuraman | ......... | G06F 11/004 714/47.1 |
| 8,868,824 B2 * | 10/2014 | Sankar | .................... | G06F 3/061 711/103 |
| 9,146,875 B1 * | 9/2015 | Boyle | ................. | G06F 12/0866 |
| 9,251,019 B2 * | 2/2016 | Losh | .................... | G06F 11/2053 |
| 2007/0266200 A1 * | 11/2007 | Gorobets | ............. | G06F 11/008 711/103 |
| 2009/0077436 A1 | 3/2009 | Lo et al. | | |
| 2009/0213655 A1 * | 8/2009 | Roohparvar | ........ | G11C 11/5621 365/185.05 |
| 2010/0122200 A1 * | 5/2010 | Merry, Jr. | ........... | G06F 12/0246 715/771 |
| 2013/0055012 A1 | 2/2013 | Roh | | |
| 2014/0149648 A1 | 5/2014 | Roohparvar | | |
| 2014/0281661 A1 | 9/2014 | Milton et al. | | |
| 2016/0342345 A1 * | 11/2016 | Kankani | ............... | G06F 3/0616 |
| 2017/0221573 A1 | 8/2017 | Darragh et al. | | |

OTHER PUBLICATIONS

International Search Report and Written Opinion, PCT/US2019/014774, dated Apr. 29, 2019.
Jon Tanguy, "Addressing Data Retention in SSDs", May 18, 2015.

* cited by examiner

*Primary Examiner* — Elmira Mehrmanesh
(74) *Attorney, Agent, or Firm* — Greenberg Traurig

(57) ABSTRACT

A computer system having a host in communication with a data storage device that is coupled to the host via a peripheral bus and a host interface. The data storage device has a controller, non-volatile storage media; and firmware containing instructions to configure the operations of the controller. The computer system allows a user of the system to specify a service option for operating the data storage device beyond its end of normal service life. The user selected option is stored in the computer system and controls the operations of the storage device beyond its end of service life.

12 Claims, 2 Drawing Sheets

END OF SERVICE LIFE OF DATA STORAGE DEVICES

FIELD OF THE TECHNOLOGY

At least some embodiments disclosed herein relate to computer storage devices in general and more particularly but not limited to solid state drives (SSDs).

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

Some erasable computer storage media, such as Compact Disc-ReWritable, DVD recordable, DVD-RAM, electrically erasable programmable read-only memory (EEPROM), and/or flash memory, have useful service periods limited by the cycles of program and erase to store data. A program erase (P/E) budget represents a predetermined number of cycles of program and erase that can be performed reliably for recording data in an erasable medium. After the predetermined cycles of erasure, the program erase (P/E) budget of such for the erasable medium is used up; and as a result, the medium may become unreliable in a statistical sense and thus is considered at the end of its useful service life.

A solid state drive typically has many blocks of memory units. Each of the memory blocks can be programmed and erased separately. The degree of wear of each memory block is proportional to the number of erasure operations performed on the memory block.

Wear leveling can be performed in a solid state drive such that the operations of erasure are distributed across the memory blocks in the solid state drive.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
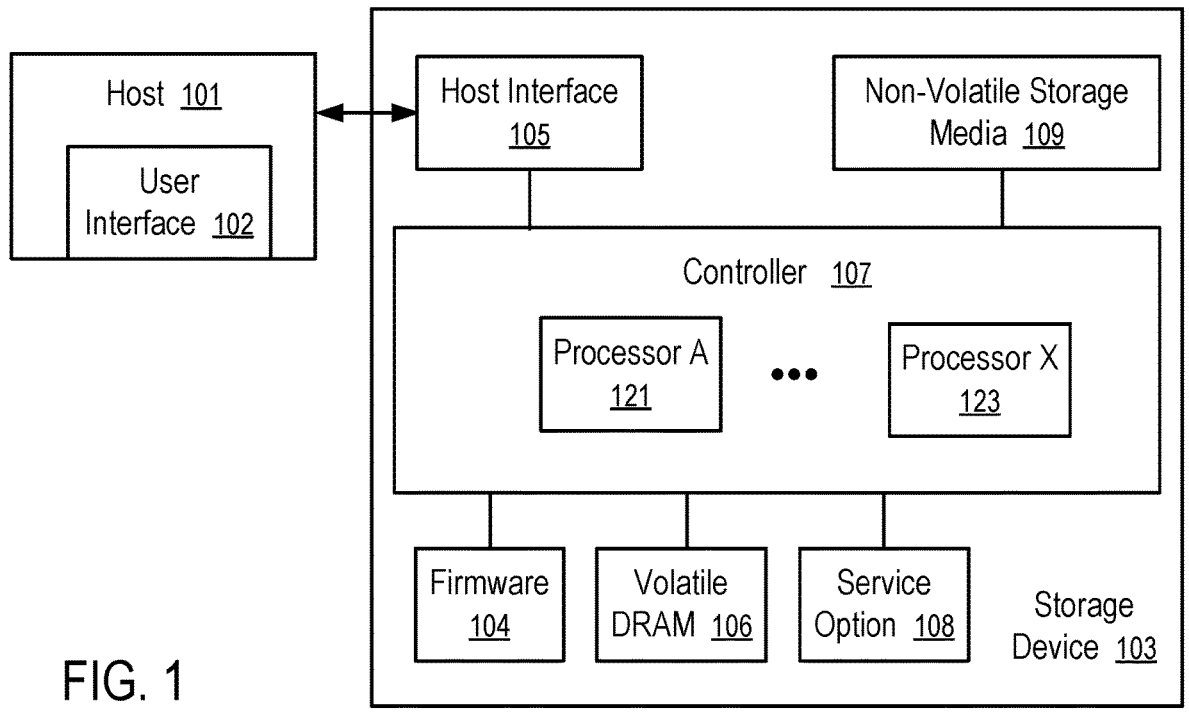
FIG. 1 shows a computer system having a data storage device that has a configurable option to control the operations of the data storage device beyond an end of normal service life of the data storage device.

A data storage device, such as a solid state drive (SSD), has a designed service life for normal operations. After the end of the service life, the memory units of the data storage device may become unreliable in a statistical sense. However, different users of data storage devices may have different needs and different requirements. After reaching the end of its service life, a storage device may still provide valuable services to meet certain needs of certain users in certain ways. At least embodiments disclosed herein allow a particular user/owner of a solid state drive to identify an option to operate the data storage device beyond its end of normal service life in a way identified by a user selected option.

For example, when the use of at least a portion of the memory units of a solid state drive (SSD) reaches a predetermined program erase (P/E) budget, the solid state drive may be considered to have reached its end of normal service life. However, the solid state drive may continue to read and write data in various portions of the solid state drive many times without errors.

For example, once it is determined that a solid state drive (SSD) has a count of errors that is above a threshold, or has more than a threshold count of dead dies of flash memory, the solid state drive (SSD) may be considered to have reached its end of normal service life. The probability of errors and data loss in the solid state drive (SSD) may become higher than a threshold.

However, after a solid state drive (SSD) reaches its end of normal service life, the solid state drive (SSD) may provide useful services when a certain amount of errors or data loss can be tolerated. For example, the solid state drive may be used to store temporarily downloaded video clips; and an amount of errors or data loss in the downloaded video clips may not have significant impact on the playback of videos and/or user experience. Thus, the user may decide to tolerate the potential errors or data loss in exchange of the extended use of the solid state drive (SSD).

In some instances, when the user may wish to minimize data errors or data loss while using the solid state drive (SSD) beyond its end of normal service life, the solid state drive (SSD) may be locked down in a read-only mode after its end of normal service life.

In other instances, the user may choose to balance the risk of data loss and the benefit of the extended use of the solid state drive (SSD) by deploying data redundancy on the solid state drive (SSD), which may trade the size of available data storage capacity for improved reliability. For example, the data stored in a portion of the solid state drive may be mirrored automatically by the solid state drive on another portion of the solid state drive. For example, the solid state drive may use striping and parity techniques to store redundant information that can be used to detect certain errors and recover data in view of data error or lost in part of storage media of the solid state drive, in a way similar to the operations of Redundant Array of Independent Disks (RAID).

In the present disclosure, a solid state drive (SSD) and/or a computer system having the solid state drive installed therein offers its user/owner/administrator a plurality of options to continue operations beyond the end of normal service life. For example, the user may choose to operate the drive in a read-only mode, in a mode that maximize storage capability, or in a redundancy mode.

For example, once the SSD is determined to be near the end of its life (e.g., having more than a predetermined number of errors, more than a predetermined number of dead dies), the SSD or the computer system may prompt the user/owner/administrator to select a service option to operate the SSD after its end of service life. The selected option is stored in the SSD and/or in the computer system. After an option is selected, the SSD and/or the computer system further may monitor the use of the SSD to detect the end of the service life of the SSD. When the end of the service life is reached, the SSD and/or the computer system may reconfigure the SSD for operations in accordance with the stored option.

For example, if the read-only mode is selected, the SSD and/or in the computer system rejects further requests to write data in the SSD.

For example, if the maximizing-storage-capacity mode is selected, the SSD and/or in the computer system may periodically communicate the risk of data loss and/or errors to the user such that the data stored on the SSD is in consistent with the error tolerance level of the user. In some instances, the SSD may periodically assess the current and/or expected error rate and generate reports, notifications, and/or alerts to the user/administrator. In some instances, the SSD and the computer system monitors the types of data stored in the SSD to detect instances of storing data that may be sensitive to data loss and errors.

For example, the user may identify a set of data activity types that generate data insensitive to storage errors and/or data loss; alternatively or in combination, the user may identify another set of data activity types that generate data sensitive to storage errors and/or data loss. The SSD and/or the computer system is configured to monitor the storing of data in the SSD in connection with the activities that generate the data to determine the likelihood of sensitivity of the data to be stored in the SSD. If a set of data that is sensitive to storage errors and/or data loss is to be stored on the SSD, the computer system may generates an alert to its user and/or optionally blocks the data storage attempt.

For example, if the redundancy mode is selected, the SSD and/or the computer system may require the user to free up an amount of storage spaces for redundancy operations. When a sufficient amount of free storage spaces become available, the SSD and/or the computer system can automatically configure the redundancy operations, providing the user with a reduced storage capacity with improved reliability beyond the end of normal service life of the SSD.

After the end of normal service life, the SSD detects bad memory units and exclude their use for data storage. Thus, the useful storage capacity of the SSD may decrease over a period of time during the extended use of the SSD.

FIG. 1 shows a computer system having a data storage device (103) that has a configurable option (108) to control the operations of the data storage device (103) beyond an end of normal service life of the data storage device (103).

The storage device (103) in the computer system of FIG. 1 is attached to a host (101). The host (101) has a user interface (102) that can be used by a user of the computer system to specify the option (108) for operating the storage device (103) after its end of the normal service life.

For example, the user interface (102) can be configured to present a list of options and requests the user select one option from the list as the service option (108). The service option (108) controls and/or limits the operations of the storage device (103) after its end of the normal service life.

Preferably, the service option (108) is specified before the end of the normal service life of the storage device (103) is reached and reviewed and/or confirmed upon the end of the normal service life of the storage device (103). The user interface (102) may allow the user to change the service option (108) after the end of the normal service life of the storage device (103) and thus change the operations of the storage device (103).

Preferably, the service option (108) is stored in the storage device (103). Alternatively, or in combination, the service option (108) can be stored in the host (101) and/or at a network location.

In some implementations, one section of the non-volatile storage media (109) has a normal service life that is much longer than the normal service life of the remaining portion of the non-volatile storage media (109). Mission critical data, such as the service option (108), is stored in such a section.

In some implementations, the storage device (103) reserves a section of the non-volatile storage media (109) to keep the degree of wearing in the reserved section significantly lower than the wearing in the remaining portion of the non-volatile storage media (109). The reserved section can be used reliably after the end of the service life of the storage device (103) and/or the remaining portion of the non-volatile storage media (109). The reserved section can be used to store data critical for the reliable operation of the storage device (103) as a whole after the end of the service life of the SSD, such as the service option (108).

After the end of normal service life is reached, the storage device (103) is configured to operate in a particular way specified by the service option. The restrictions and/or configurations imposed by the service option can be implemented via a controller (107) of the storage device (103) running its firmware (104) and/or via the host (101) running software in accordance with the service option (108).

For example, when the service option (108) requires a read-only mode, the controller (107) may reject write commands/request submitted from the host (101). Alternatively, or in combination, the host (101) may configure the storage device (103) as read-only and reject write requests from applications running in the host (101).

The controller (107) is configured via the firmware (104) to detect non-functioning memory units in the non-volatile storage media (109) and block the use of the non-functioning memory units. For example, when retrieving data from a memory unit or programming data into the memory unit, the controller (107) determines whether there is an error. In response to an error, the controller (107) may further determine whether the memory unit is no longer functioning and/or has failed. If the memory unit is no longer functioning, the controller (107) may adjust the mapping between logical addresses used by the host (101) to access the storage device (103) and physical addresses used by the storage device (103) to access the non-volatile storage media (109) such that the logical addresses are mapped to the physical addresses of functioning memory units.

After the end of the normal service life, the controller (107) and/or the host (101) may offer a reduced storage capacity for use by the user. The reduced storage capacity is mapped to a functioning portion of the non-volatile storage media (109). Memory units not in the reduced storage capacity are used as reserved memory units that can be remapped to replace non-functioning memory units in the reduced storage capacity. For example, when a memory unit servicing the reduced storage capacity is found to be non-functioning, the controller (107) adjusts the mapping between logical addresses used by the host (101) and physical addresses of the memory units in the non-volatile storage media (109) such that the non-functioning memory unit previously corresponds to a logical address used by the host is replaced with a functioning memory unit allocated from the reserve to service the same logical address. Thus, the host (101) may continue to use the logical address. In some instances, the service option (108) includes a size of the reduced storage capacity and/or the size of the reserved memory units.

Alternatively or in combination, the controller (107) may map the addresses of the non-functioning memory units to a logical address that is to be retired from service. The controller (107) informs the host (101) of the non-functioning logical addresses such that the host (101) may avoid storing data in the logical addresses that are identified as non-functioning. The controller (107) may adjust the mapping between the logical addresses and physical addresses such that non-functioning logical addresses are aggregated as a block of logical addresses for improved efficiency in identification. For example, the controller (107) maps the non-functioning logical address to the highest addresses of the address space in which the logical addresses used by the host are defined. Thus, the region of non-functioning logical addresses can be identified by the highest functioning logical address, the lowest non-functioning logical address, or a size of address space of the functioning logical addresses.

When a selected service option (108) requires implementation of data redundancy (e.g., via mirroring, striping, and/or parity), the controller (107) or the host (101) may implement the redundancy operations. For example, a RAID configuration can be implemented on different portions or sections of the non-volatile storage media (109) for data redundancy that can tolerant a level of data loss. The implementation of data redundancy can significantly reduce the storage capacity for storing user data.

The controller (107) of the storage device (103) may have multiple processors (121, . . . , 123). One or more of the processors (121, . . . , 123) can be configured via the firmware (104) to implement that the service option (108).

The host (101) illustrated in FIG. 1 communicates with the storage device (103) via a communication channel having a predetermined protocol. In general, the host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The controller (107) of the storage device (103) runs firmware (104) to perform operations responsive to the communications from the host (101). Firmware in general is a type of computer program that provides control, monitoring and data manipulation of engineered computing devices.

In general, the non-volatile storage media (109) of the storage device (103) can be implemented as memory cells in an integrated circuit, or magnetic material coated on rigid disks. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has lower latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or the add-on modules (133) organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

Figure 2:
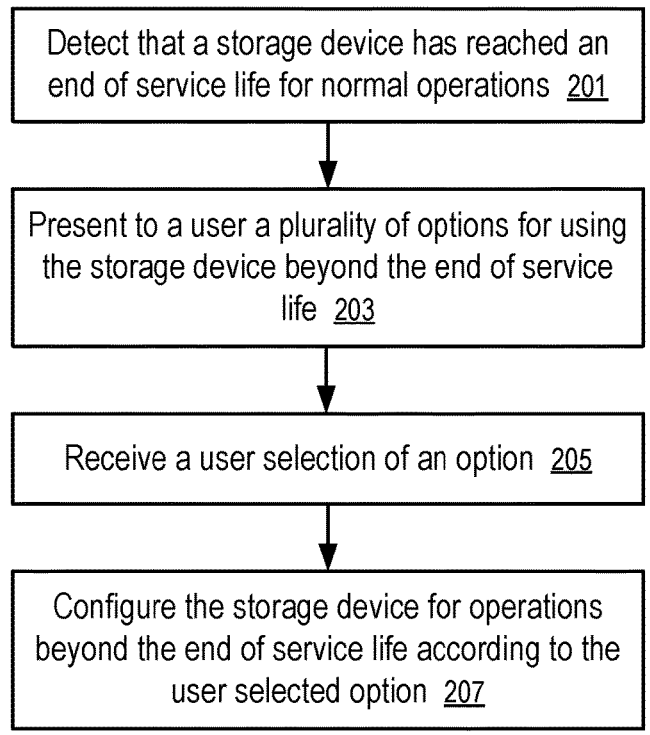
FIG. 2 shows a method to manage end of service operations of a data storage device.

FIG. 2 shows a method to manage end of service operations of a data storage device. For example, the method of FIG. 2 can be implemented in the system of FIG. 1.

The method of FIG. 2 includes: detecting (201) that a storage device (103) has reached an end of service life for normal operations; presenting (203), to a user, a plurality of options for using the storage device (103) beyond the end of service life; receiving (205) a user selection of an option (108); and configuring (207) the storage device (103), for operations beyond the end of service life, according to the user selected option (108).

The end of service life can be detected based on detecting more than a threshold amount of errors in the non-volatile storage media (109) of the storage device (103), more than a threshold number of memory units in the non-volatile storage media (109) that have reached their program erase (P/E) budget, and/or more than a threshold number of hardware failures in the non-volatile storage media (109).

The options can be presented and/or selected before or after the determination that the end of service life for normal operations has reached. The service option (108) may be changed before or after the end of service life. In some instances, the storage device (103) has a pre-configured service option (108) (e.g., read-only), which can be changed by the user according to the needs and/or requirements of the user for an alternative mode of use after the end of service life of the storage device (103).

Figure 3:
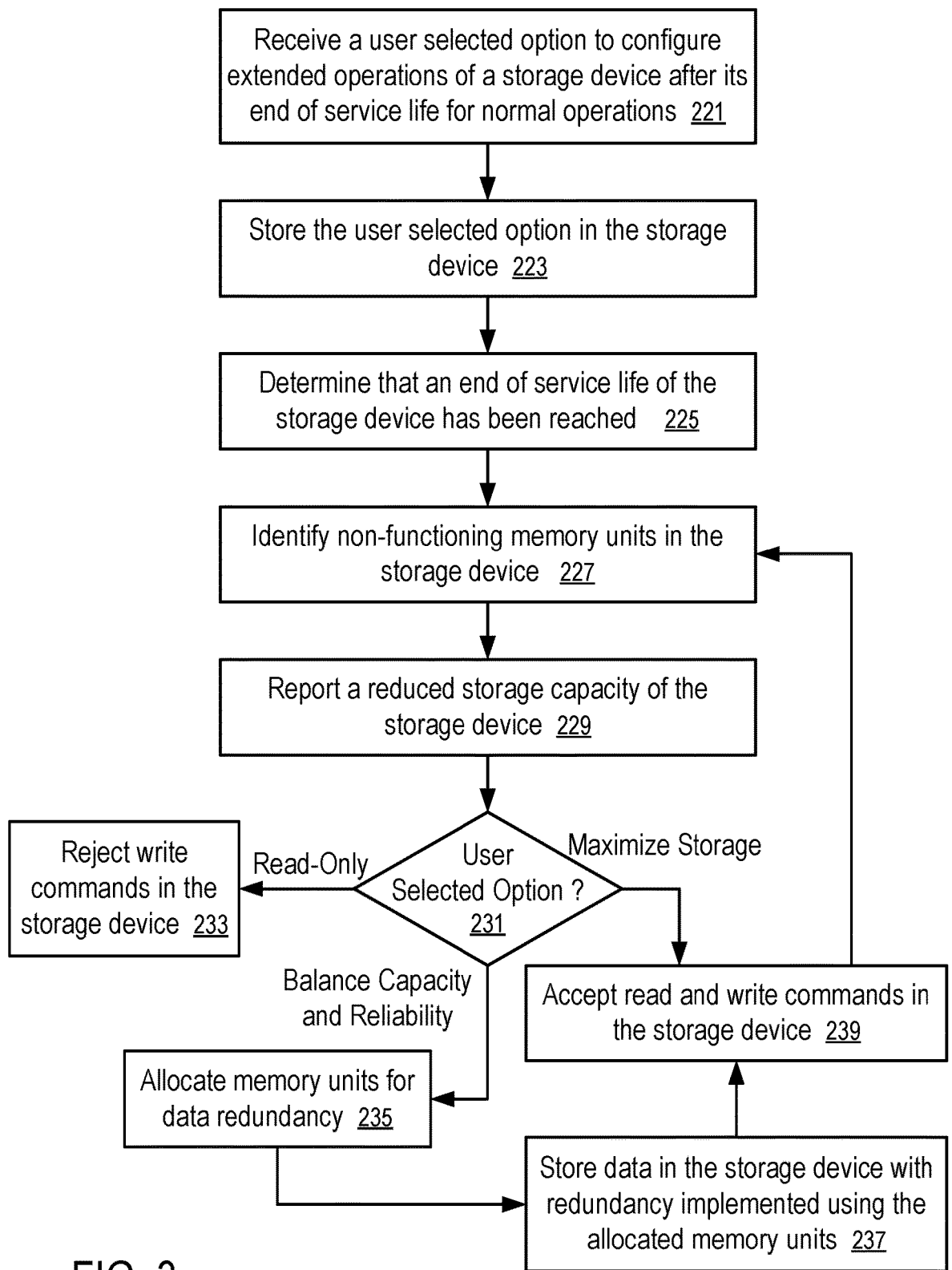
FIG. 3 shows a detailed method to operate a data storage device beyond an end of service.

FIG. 3 shows a detailed method to operate a data storage device beyond an end of service. For example, the method of FIG. 3 can be implemented in the system of FIG. 1 in combination with the method of FIG. 2.

The method of FIG. 3 includes: receiving (221) a user selected option (108) to configure extended operations of a storage device (103) after its end of service life for normal operations; storing (223) the user selected option (108) in the storage device (103); determining (225) that an end of service life of the storage device (103) has been reached; identifying (227) non-functioning memory units in the storage device (103); and reporting (229) a reduced storage capacity of the storage device (103).

If (231) the user selected option (108) is for a mode of read-only operation, the method of FIG. 3 further includes rejecting (233) write commands in the storage device (103).

If (231) the user selected option (108) is for a mode of maximizing storage for usages that can tolerate data errors and losses, the method of FIG. 3 further includes accepting (239) read and write commands in the storage device (103).

If (231) the user selected option (108) is for a mode of balancing capacity and reliability, the method of FIG. 3 further includes: allocating (235) memory units for data redundancy; storing (237) data in the storage device with redundancy implemented using the allocated memory units; and accepting (239) read and write commands in the storage device (103).

For example, a computer system has a host (101) and a storage device (103). The storage device (103) has: a host interface (105) in communication with the host (101); a controller (107); non-volatile storage media (109); and firmware (104) containing instructions executable by the controller (107). The computer system is operable to accept and store a user specified service option (108) and configure operations of the storage device (103) beyond an end of service life in accordance with the user specified service option (108).

The storage device (103) may determine the end of the service life based on detecting more than a threshold number of errors in the non-volatile storage media (109), detecting more than a threshold number of hardware failures in the non-volatile storage media (109), and/or a determination that more than a threshold portion of the non-volatile storage media (109) has reached a predetermined number of program erase cycles.

The computer system provides a user interface (102) to present a list of options from which the user specified service option is selected. The user specified service option replaces a default option or a previously specified service option.

The storage device (103) may reserve a section of the non-volatile storage media (109) and maintain the section to have less wearing than the non-volatile storage media outside of the section. The reserved section is used to store the user specified service option (108) and/or other data for the operation of the storage device (103) beyond its end of normal service life.

The list, for example, may include an option to operate the storage device (103) in a read-only mode after the end of the service life of the storage device (103), an option to operate the storage device (103) in a data redundancy mode after the end of the service life of the storage device (103), and/or an option to operate the storage device (103) in a mode of maximized storage capacity after the end of the service life of the storage device (103).

In some instances, the user may specify different modes for different portions of the non-volatile storage media (109). For example, the user may request that a first portion of the non-volatile storage media (109) be operated in a read-only mode, a second portion of the non-volatile storage media (109) be operated in a redundancy mode, and a third portion of the non-volatile storage media (109) be operated in a maximized-capacity mode.

The storage device (103) detects non-functioning or failed memory units in the non-volatile storage media (109) and maps logical addresses used by the host to a reduced set of memory units of the non-volatile storage media (109), where the reduced set excludes the detected non-functioning memory units.

When the user specified service option (108) requires the data redundancy mode, the computer system allocates a portion of the non-volatile storage media to apply a mirroring technique and/or a striping and parity technique.

When the user specified service option (108) operates the storage device (103) in the mode of maximized storage capacity, the computer is configured to monitor data activities on the computer system in accordance with a set of rules that identify certain types of data activities as sensitive to data errors or losses and/or certain types of data activities as insensitive to data errors or losses. In response to detecting a request to store, in the storage device (103) after its end of service life, data sensitive to error or losses, the computer system generates an alert to its user and optionally blocks the request.

The storage device (103) of one embodiment is a solid state drive that is coupled to the host (101) via a communication bus, such as a peripheral component interconnect express bus in accordance with a non-volatile memory host controller interface specification.

A non-transitory computer storage medium can be used to store instructions of the firmware (104). When the instructions are executed by the controller (107) of the computer storage device (103), the instructions cause the controller (107) to perform a method discussed above.

In the present disclosure, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer system, comprising:
   a host; and
   a storage device having:
      a host interface in communication with the host;
      a controller;
      non-volatile storage media; and
      firmware containing instructions executable by the controller; and
   wherein the computer system is operable to accept and store a user specified service option and configure operations of the storage device beyond an end of service life in accordance with the user specified service option,
   wherein the storage device determines the end of the service life, as specified by the user, based on one of detecting more than a threshold number of errors in the non-volatile storage media, detecting more than a threshold number of hardware failures in the non-volatile storage media, and a determination that more than a threshold portion of the non-volatile storage media has reached a predetermined number of program erase cycles;
   wherein the computer system provides a user interface to present a list of options from which the user specified service option is selected, the list of options includes one of an option to operate the storage device in a read-only mode, to operate the storage device in a data redundancy mode, and to operate the storage device in a mode of maximized storage capacity.

2. The computer system of claim 1, wherein the storage device detects non-functioning memory units in the non-volatile storage media and maps logical addresses used by the host to a reduced set of memory units of the non-volatile storage media, the reduced set including none of the detected non-functioning memory units.

3. The computer system of claim 1, wherein when the user specified service option requires the data redundancy mode, the computer system allocates a portion of the non-volatile storage media to apply at least one of:
   a mirroring technique; and
   a striping and parity technique.

4. The computer system of claim 1 wherein when the user specified service option operates the storage device in the mode of maximized storage capacity, the computer is configured to monitor data activities on the computer system to detect a request to store data sensitive to error or losses and generate an alert in response to the request.

5. The computer system of claim 1 wherein the storage device is a solid state drive.

6. The computer system of claim 5, further comprising:
   a communication bus coupled between the host and the storage device.

7. The computer system of claim 5, wherein the communication bus is a peripheral component interconnect express bus.

8. The computer system of claim 7, wherein the host communicates with the storage device in accordance with a non-volatile memory host controller interface specification.

9. A method implemented in a storage device, the method comprising:
   receiving, in the storage device coupled to a host, a user specified service option, the storage device having:
      a host interface in communication with the host;
      a controller;
      non-volatile storage media; and
      firmware containing instructions executable by the controller;
   storing, in the storage device, the user specified service option;
   detecting an end of service life of the storage device; and
   configuring operations of the storage device beyond the end of service life in accordance with the user specified service option,
   wherein the storage device determines the end of the service life, as specified by the user, based on one of detecting more than a threshold number of errors in the non-volatile storage media, detecting more than a threshold number of hardware failures in the non-volatile storage media, and a determination that more than a threshold portion of the non-volatile storage media has reached a predetermined number of program erase cycles;
   wherein a computer system provides a user interface to present a list of options from which the user specified service option is selected, the list of options includes one of an option to operate the storage device in a read-only mode, to operate the storage device in a data redundancy mode, and to operate the storage device in a mode of maximized storage capacity.

10. The method of claim 9, wherein storing of the user specified service option replaces a previously specified service option.

11. The method of claim 9, further comprising:
    reserving a section of the non-volatile storage media; and
    maintaining the section to have less wearing than the non-volatile storage media outside of the section;
    wherein the user specified service option is stored in the section.

12. A non-transitory computer storage medium storing instructions which, when executed by a computer system, cause the computer system to perform a method, the method comprising:
    receiving, in the computer system, a user specified service option, the computer system having a host and a storage device coupled to the host, the storage device having:
       a host interface in communication with the host;
       a controller;
       non-volatile storage media; and
       firmware containing instructions executable by the controller;
    storing, in the computer system, the user specified service option;
    detecting an end of service life of the storage device; and
    wherein the storage device determines the end of the service life, as specified by the user, based on one of detecting more than a threshold number of errors in the non-volatile storage media, detecting more than a threshold number of hardware failures in the non-volatile storage media, and a determination that more than a threshold portion of the non-volatile storage media has reached a predetermined number of program erase cycles;

wherein the computer system provides a user interface to present a list of options from which the user specified service option is selected, the list of options includes one of an option to operate the storage device in a read-only mode, to operate the storage device in a data redundancy mode, and to operate the storage device in a mode of maximized storage capacity.

* * * * *